R. Bragg.
Skid for Discharging & Loading Vessels.
Nº 39,211. Patented Jul. 14, 1863.
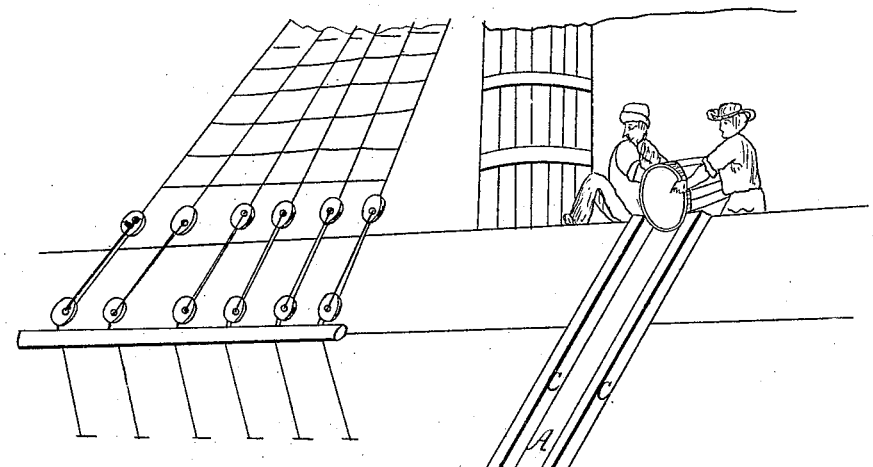
Fig: 1
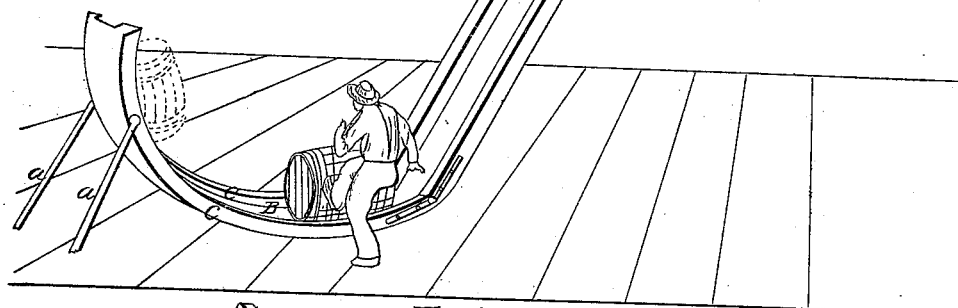
Fig: 2
Witnesses:
Geo. H. Pike
Julius Silversmith
Inventor.
Robert Bragg

UNITED STATES PATENT OFFICE.

ROBERT BRAGG, OF SAN FRANCISCO, CALIFORNIA.

IMPROVED SKID FOR DISCHARGING AND LOADING VESSELS.

Specification forming part of Letters Patent No. 39,211, dated July 14, 1863.

*To all whom it may concern:*

Be it known that I, ROBERT BRAGG, of the city and county of San Francisco, in the State of California, have invented and constructed a new and Improved Machine for Discharging and Loading Vessels, entitled "Bragg's Discharging and Loading Skid;" and I do hereby declare that the following is a full, clear, and exact description of its construction and operation, reference being had to the accompanying drawings and the letters of reference marked thereon, making a part of this specification, in which—

Figure 1 is a perpective view. Fig. 2 is a sectional view.

The nature of my invention is designed to facilitate the discharging or loading of vessels, especially where the bulwarks are too high elevated or too much below the dock or wharf, of hogsheads, pipes, barrels, casks, or kegs and where the material or contents are liable to injury or waste; furthermore, that economy of time and labor may be secured in discharging or loading a cargo of this nature from the deck or port-holes of any vessel by the means or device I employ, and as will herein appear.

To enable others skilled in the art to make and use my invention, I will proceed to describe its construction and operation.

I construct the skid A in the usual manner of any given dimension. To the lower end I attach by means of hinges a circular skid, B, and should be made of the same width or dimensions as the skid A.

The entire skid A B may be represented by a plain surface constructed of substantial wood, the same being provided with a raised shoulder or elevation, C C, which should be protected from wear and tear by sheet-iron straps firmly attached or secured thereto, inasmuch that the hogsheads, pipes, &c., are allowed to slide endwise over the skid.

I construct the lower or circular skid, B, of any given arc or circle and to suit the wants and requirements. The lower end of the skid A with the upper end of the skid B are held together by means of a rod and iron hinges securely fastened to the sides thereof. The ends of said pieces or skids forming this joint are trimmed or shaped, so that should the position of either skid be changed it will always present or form a permanent joint.

When the entire skid is used in discharging or loading, the joint rests upon the dock, wharf, or ground. The circular piece B is poised or supported by means of two or more movable pins, *a a*, and are fastened securely to the sides thereof. The upper end of the skid A, which rests against the side of the vessel, may be provided with any of the known devices for keeping the same in its desired position.

Its operation may be summed up as follows: The cask or barrel is placed endwise, and will slide downward with considerable velocity, passing over the curved arc, thence upward, when its momentum is impeded; thence the same will gradually slide back and will rest in the curved arc, from which position it may be readily lifted or rolled over on the dock.

I have constructed and employed this device with great success, more especially in the discharging of butter-casks from the steamers of the Pacific Mail Steamship Company at San Francisco.

My invention may with great advantage be employed in the loading or discharging of ammunition, such as cannon-ball, shot, shell, or other projectiles. It particularly recommends itself to the use of steamers, where, on account of the hurricane-decks, the swinging tackle cannot be employed.

I do not broadly claim the skid; but

What I claim as my invention or improvement, and for which I desire to secure Letters Patent, is—

The construction and application of the circular arc B, as attached to the skid A, operating substantially as described, and for the purposes set forth herein.

ROBERT BRAGG.

Witnesses:
GEO. H. PIKE,
JULIUS SILVERSMITH.